L. P. CRECELIUS.
RAIL BONDING APPARATUS.
APPLICATION FILED DEC. 7, 1914.
1,242,526.
Patented Oct. 9, 1917.
2 SHEETS—SHEET 1.
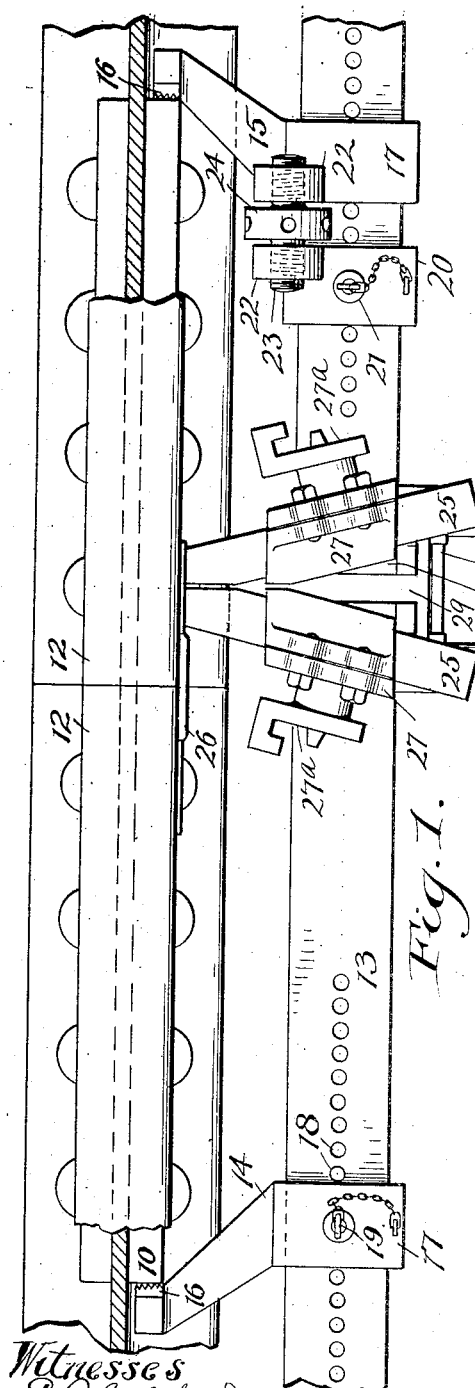
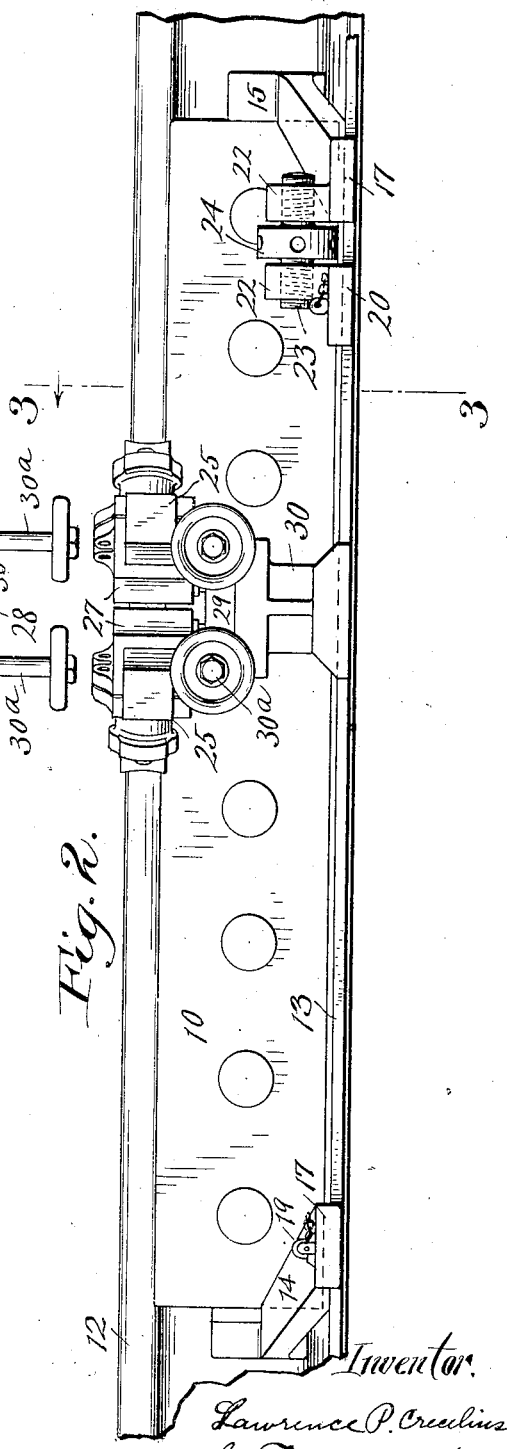

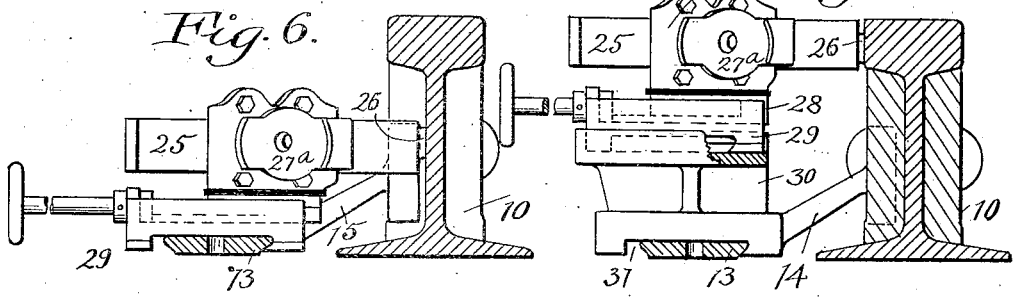
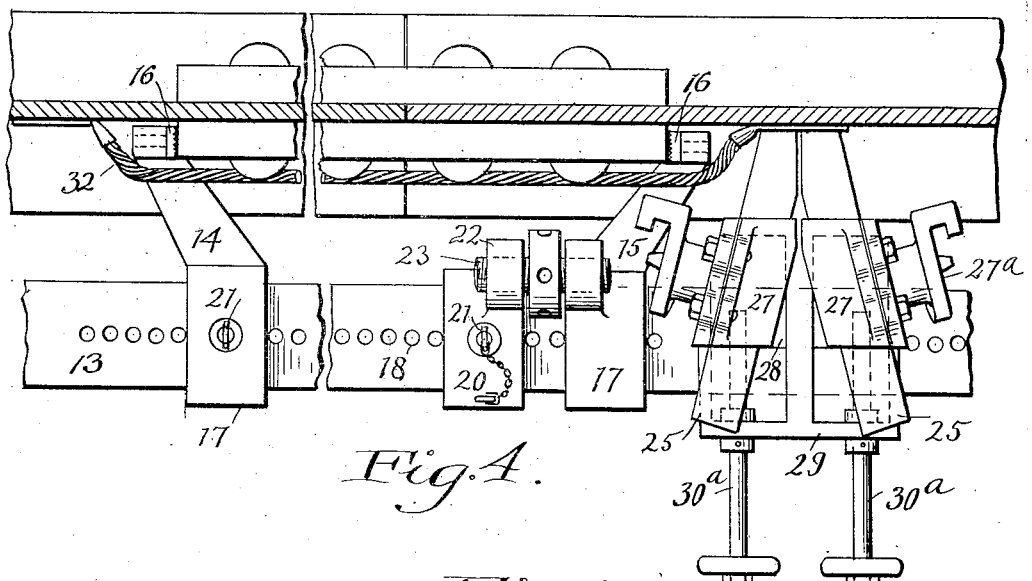
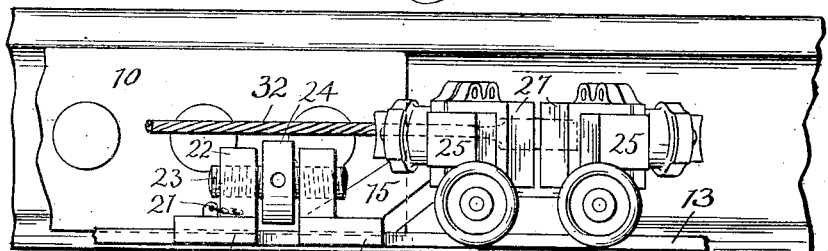

UNITED STATES PATENT OFFICE.

LAWRENCE P. CRECELIUS, OF CLEVELAND, OHIO, ASSIGNOR TO THE ELECTRIC RAILWAY IMPROVEMENT COMPANY, OF CLEVELAND, OHIO, A CORPORATION OF OHIO.

RAIL-BONDING APPARATUS.

1,242,526.

Specification of Letters Patent.

Patented Oct. 9, 1917.

Application filed December 7, 1914. Serial No. 875,900.

*To all whom it may concern:*

Be it known that I, LAWRENCE P. CRECELIUS, a citizen of the United States, residing at Cleveland, in the county of Cuyahoga and State of Ohio, have invented a certain new and useful Improvement in Rail-Bonding Apparatus, of which the following is a full, clear, and exact description.

This invention relates to rail bonding apparatus, and particularly to that type wherein one or more heating electrodes are supported by a supporting structure or device which is clamped or secured to the track in such a manner that the gage line is clear and unobstructed.

The present invention resides particularly in means by which the electrodes may be effectively supported at the side of the rail, and in the preferred embodiment this includes a supporting device which is designed to engage or to be clamped to a fish plate of the rails, this apparatus being designed particularly to permit the bonding of rails after the fish plates have been applied thereto.

My invention may be further briefly summarized as consisting in certain novel details of construction and combinations and arrangements of parts which will be described in the specification and set forth in the appended claims.

In the accompanying sheets of drawings, Figure 1 is a plan view of the apparatus in position for bonding two adjacent rails, the apparatus here shown being employed for attaching the terminals of the bond to the heads of the rails; Fig. 2 is a side view of the same looking toward the rails; Fig. 3 is a cross sectional view substantially along the line 3—3 of Fig. 2 looking in the direction indicated by the arrow; Fig. 4 is a view similar to Fig. 1 with parts broken and the rail in section, this view showing the apparatus in position for bonding the rails around the fish plates; Fig. 5 is a side view of a portion of the same looking toward the rails; and Fig. 6 is a cross sectional view of the apparatus shown in Figs. 4 and 5.

The apparatus as here shown includes a pair of heating electrode holding parts and a base or supporting clamp upon which the former are mounted. In the preferred embodiment of my invention, the base or supporting clamp which supports the electrodes is designed to be clamped to the ends of a fish plate 10 of the rails 12, and it includes a bar 13 which when the apparatus is in position for bonding is horizontal and extends alongside of and parallel to the rails. This bar is securely held in this position by two clamping arms 14 and 15 provided at their inner ends with removable clamping jaws 16, which engage the ends of a fish plate, and their outer ends having enlarged portions or heads 17 provided with undercut slots which receive the bar 13 with a sliding fit.

It will be observed that the bar 13 is provided with a series of openings 18 for the purpose of receiving locking pins. The bar can be locked or fastened to the clamping arm 14 by a locking pin 19, which is adapted to be extended down through an opening in the head or enlarged part 17 of the arm 14, and through any one of the openings 18. The other arm 15 has associated with it means by which there may be a close adjustment of the arm relative to the bar, so as to secure tight clamping action on to the fish plate. This includes a locking plate 20, which can be locked to the bar by means of a pin 21 designed to be inserted through an opening in the plate 20 and into one of the openings 18. This plate and the head 17 of the arm 15 are provided with a pair of adjacent bosses 22 having threaded openings which receive right and left hand threaded portions of an adjusting screw 23 having at the center a flange 24 with suitable openings in which a tool may be inserted for turning the screw to clamp the structure so far described very securely to the fish plate.

The remaining part of the bonding apparatus including the electrodes and the parts carrying the same is supported on the bar 13 either between the clamping arms 14 and 15, as when the bond is to be attached to the heads of the rails above the fish plates, or on the end portions of the bar 13 extending beyond the clamping arms 14 and 15 as when the bond is to be attached to the webs of the rails beyond the ends of the fish plate, the rails then being bonded around the fish plate. In Figs. 1, 2 and 3 the apparatus is shown for use in attaching the bond to the heads of the rails above the fish plates, but whether the bonds are attached at one or the other of the two points the apparatus is the same, except that when the bond is attached to the heads of the rails an additional elevating chair is utilized to bring the electrodes up to the level of the heads of the rails.

Although as far as certain features of my invention are concerned, it is immaterial whether I employ one or more than one of the high resistance heating electrodes. I prefer to employ two heating electrodes 25 which are formed of carbon and which when in use are simultaneously pressed against the terminal of the bond (which in Figs. 1, 2 and 3 is shown at 26) in such a manner that the heating current passes through the two electrodes and through the terminal of the bond with the three parts in series relationship, thus heating the bond terminal, rail, and interposed braze or spelter in such a manner that the bond is quickly and effectively brazed to the rail, this method of bonding being preferably utilized for brazing the bond to the rail. The two electrodes are securely mounted in box like holders 27, which are carried by slides 28 adjustably mounted in guide slots of an electrode carrying member 29, which is provided with a pair of adjusting screws 30$^a$ engaging the slides 28, in such a manner that the electrodes may be adjusted toward and from the rail so that they will be caused to bear with equal or predetermined pressure against the bond terminal.

In the event the bond is to be attached to the heads of the rail, as shown in Figs. 1 to 3, the electrode carrier 29 will be supported in the upper portion of a chair 30, which in turn will rest upon the bar 13, said chair having on its lower side a slot 31 slightly wider than the bar 13 and adapted to receive the same as shown in Fig. 3. When the apparatus is in use the forward or inner edge of the bar 13 will engage in the forward or inner edge of the slot 31.

When one terminal of the bond is attached to one rail, the electrodes will be backed away from the rail by the adjusting screws 30$^a$, and thence the chair 30 and the parts supported thereby including the electrodes will be slid as a unit along the bar to a point opposite that at which the other terminal of the bond is to be applied to the other rail, and thence the other terminal of the bond is attached.

In the event the rails are to be bonded around the fish plates, as shown in Figs. 4, 5 and 6, the terminals of the bond designated 32 in Figs. 4 and 5 are attached to the web of the rail opposite the ends of the fish plates. When the rails are to be bonded as just stated, the chair 30 is not required, and the electrode carrier 29 is mounted directly upon the bar 13, as shown in Fig. 6, this carrier having on its lower side a slot similar to the slot 31, which is provided on the lower side of the chair 30. When the rails are to be bonded as just stated, that is around the fish plates, the electrode carrying part of the apparatus is supported on the ends of the bar 13 instead of between the clamping arms 14 and 15, the electrodes being supported at one end of the bar, as shown in Fig. 4, for uniting one terminal to one rail, and thence the electrodes and the parts immediately supporting the same are lifted from that end of the bar and carried over and supported on the other end of the bar opposite the point at which the other terminal is to be attached.

I previously mentioned the fact that the clamping jaws 16 are removably held to the inner ends of the clamping arms 14 and 15. This is provided in order that the jaws may be applied to either side of the inner ends of the clamping arms, for in the event that short fish plates are employed, to provide sufficient space between the clamping arms to accommodate the bonding apparatus, it may be desirable to interchange the clamping arms end for end, so that instead of converging toward the bar, as shown in the drawings, they will diverge, and thence provide a space along the bar to accommodate the bonding apparatus greater than the length of the fish plates.

The apparatus above described has numerous advantages including flexibility in use, enabling the rails to be bonded after the fish plates are attached either above the fish plates or around the same; the clamp can be quickly attached to the fish plates, and as quickly removed therefrom for attachment to the next adjacent fish plate.

Additionally, the construction admits of the adjustment of the electrodes and the parts supporting the same relative to the bar, the electrode supporting members being capable of quick and easy adjustment lengthwise of the bar, so that the electrodes can be brought to exactly the desired point where the terminal of the bond is to be attached to the rail.

As before stated, when the bonding apparatus is in use the heating current passes through the two electrodes and terminal of the bond with the three parts in series relationship. In order that this may be done the electrode holders are insulated from the slides 28 which support them, and each holder is provided with a quick detachable coupling member 27$^a$, so that the current supplying conductors can be quickly attached to or disconnected from the holders.

Having thus described my invention, what I claim is:—

1. In a rail bonding apparatus, a support for one or more heating electrodes, comprising means for engaging opposite ends of a fish plate and a bar supported by said means at spaced points, and an electrode carrying member movable lengthwise of said bar.

2. In a rail bonding apparatus, a pair of spaced track clamps, a substantially horizontal bar supported by the same, an electrode carrier supported by said bar, said carrier having one or more electrodes and means for moving the same toward and from the rail and for pressing the same against a rail bond with sufficient pressure for rail bonding purposes.

3. In a rail bonding apparatus, a pair of clamping members adapted to engage the ends of a fish plate, a bar supported by said members at one side of the track, an electrode carrier supported by said bar and movable from one point thereof to another.

4. In a rail bonding apparatus, a supporting member adapted to be held in fixed position relative to the rails to be bonded, an electrode carrier having one or more electrodes, said carrier having means for forming supporting connection with said member, and a removable device adapted to be placed between said member and carrier and having means for forming supporting connection with the said member and with said carrier.

5. In a rail bonding apparatus, a pair of spaced track engaging members, a substantially horizontal bar supported by said members and extending beyond the same, and an electrode carrier adapted to form engagement with said bar between said track engaging members or with the end portions of the bar extending beyond said members.

6. In a rail bonding apparatus, a support for one or more heating electrodes comprising rail engaging means and a bar extending longitudinally of the rail at one side of the same when said rail engaging means is in operative position, and an electrode carrier mounted on said bar and movable from one point thereof to another, said carrier having one or more electrodes and means for moving the same toward and from the rail and for pressing the same against a rail bond with sufficient pressure for rail bonding purposes.

7. In a rail bonding apparatus, a pair of rail engaging devices and a base for an electrode carrier supported by said devices and extending longitudinally of the latter and at one side of the same when said devices are in operative position, and an electrode carrier mounted on said base, said carrier having one or more electrodes and means for moving the same toward and from the rail and for pressing the same against a rail bond with sufficient pressure for rail bonding purposes.

8. In a rail bonding apparatus, a support for one or more heating electrodes comprising rail engaging means and a bar supported thereby and extending longitudinally of the rail and at one side of the same when the rail engaging means is in operative position, and an electrode carrier supported by the bar and provided in its base with a slot adapted to accommodate the bar, said carrier having one or more electrodes and means for moving the same toward and from the rail and for pressing the same against a rail bond with sufficient pressure for rail bonding purposes.

In testimony whereof, I hereunto affix my signature in the presence of two witnesses.

LAWRENCE P. CRECELIUS.

Witnesses:
    E. B. GILCHRIST,
    A. F. KWIS.